United States Patent [19]
Ho

[11] Patent Number: 4,784,485
[45] Date of Patent: Nov. 15, 1988

[54] CONTACT LENS ZONOMETER

[75] Inventor: Arthur Ho, Randwick, Australia

[73] Assignee: Unisearch Limited, Kensington, Australia

[21] Appl. No.: 73,899

[22] Filed: Jul. 13, 1987

Related U.S. Application Data

[63] Continuation of Ser. No. 803,109, Nov. 27, 1985.

[30] Foreign Application Priority Data

Nov. 29, 1984 [AU] Australia ............................... PG8351

[51] Int. Cl.⁴ ................................................ G01B 9/00
[52] U.S. Cl. ..................................................... 356/124
[58] Field of Search .................................. 356/124–127

[56] References Cited

U.S. PATENT DOCUMENTS 2,624,237 1/1953 Davis ................................. 356/125
4,395,120 7/1983 Takahashi ......................... 356/125
4,402,609 9/1983 Kuppenheimer, Jr. ............. 356/124

FOREIGN PATENT DOCUMENTS 1103050 3/1961 Fed. Rep. of Germany ...... 356/126

OTHER PUBLICATIONS

"The Measurement of Microscopic Objects", Naegeli et al, *The Microscope in Theory and Practice*, Swann Sonnenschein, Lowrey & Co., 1887, pp. 289–291.
"An Automatic Focusing Device for Ophthalmic Lenses", Whitney, *American Journal of Optometry and Archives*, vol. 35, pp. 182–190.

Primary Examiner—R. A. Rosenberger
Assistant Examiner—Crystal Cooper
Attorney, Agent, or Firm—Michael J. Striker

[57] ABSTRACT

Apparatus to measure the size of an optic zone of a lens, particularly a contact lens or intraocular lenses, and the refractive power of that optic zone includes an illumination system with a light source and a first lens train producing a collimated beam of light from the light source, and a second lens train including an observation system coaxial with the illumination system and focusing the collimated beam so that the observation system allows an observer to observe a magnified image of the lens to be measured. The lens to be measured is disposed on a mounting plate positioned in the collimated light beam between the first and second lens trains. A planar knife edge is positioned within the focused light beam of the second lens train so that it occludes a part of that beam. A micrometer or similar device is attached to the mounting plate so as to measure the observed size of the optic zone or zones of the lens. The distance between the light source and the first lens train is variable to allow the refractive power of the optic zone or zones of the lens to be determined.

9 Claims, 4 Drawing Sheets

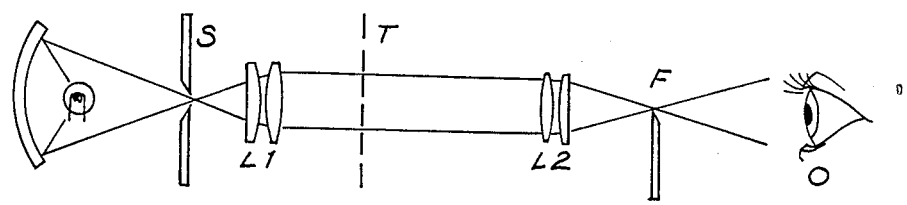
FIG. 1
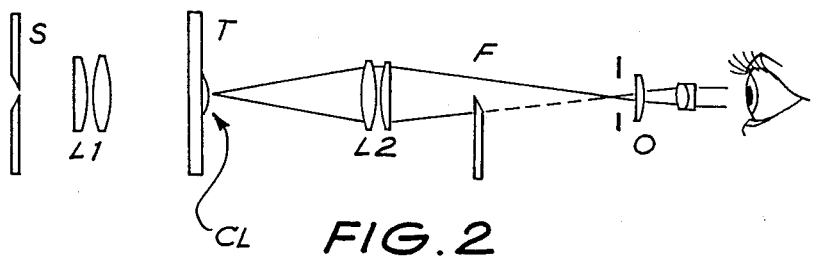
FIG. 2
FIG. 3
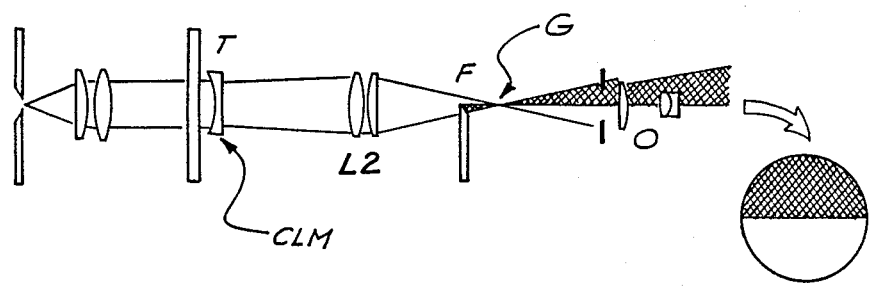

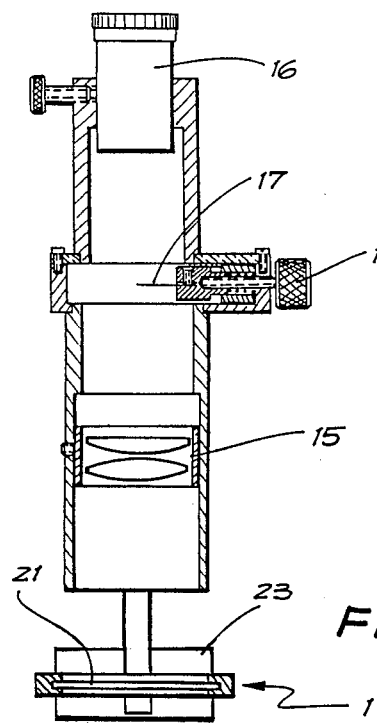
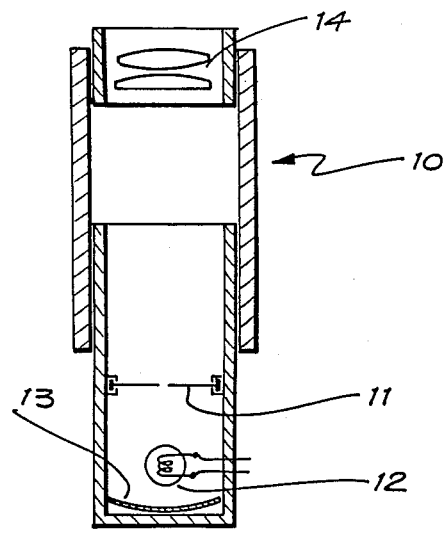
FIG. 7

CONTACT LENS ZONOMETER

This application is a continuation of application Ser. No. 803,109 filed Nov. 27, 1985.

BACKGROUND OF THE INVENTION

The present invention relates to a method of, and apparatus for, the measurement the size of an optic zone of a of contact lens or an intraocular lens and/or the power of that optic zone.

The relationship between the central optic zone size of a lens and the patient's pupil size is important in the prescribing of contact lenses and has become more so following the introduction of bifocal contact lenses. Whilst numerous devices are available to measure pupil size accurately, the task of measuring central optic zone diameters precisely can be difficult.

Typically, prior to the present invention, a projection microscope or a hand held measuring magnifier has been used to view the optic zone of a contact lens. However, such devices have two severe limitations. Firstly, the optic zones junctions of bifocal contact lens can only be seen when the difference in refractive power between the two adjacent zones is large. Secondly, these zone junctions can only be seen when they have not been blended i.e. where there is a clear disjunction between the two optic zones. Even a heavy polish without blending can render the optic zone junction invisible using the above devices.

In particular, these limitations have precluded the use of projection microscopes and hand held magnifiers in the observation and measurement of the optic zone and power of bifocal or multifocal hydrophilic lenses. This is so because the difference in power between near and distance optic zone of a bifocal is only a few dioptres. When the lens is immersed in saline solution, as is preferred for hydrophilic lenses, these power differences are decreased and the optic zones are generally undetectable. Moreover, the zone junctions are often blended thereby further reducing visibility of the individual optic zones.

SUMMARY OF THE INVENTION

It is an object of this invention to provide an improved apparatus for the measurement of the size of an optic zone of a lens and/or the refractive power of that optic zone. The apparatus of this invention comprises a light source, an illumination system including a first lens train adapted to produce a collimated beam of light from the light source, and a second lens train adapted to focus the collimated beam, mounting means positioned between the first and second lens trains and adapted to hold the lens to be measured in the collimated light beam, substantially planar opaque means positioned within, and adapted to occlude, a part of the focused beam, an observation system coaxial with the illumination system and located distal to the light source, the observation system being adapted to allow an observer to observe a lens to be measured, and measurement means to allow a determination to be made of the size of an optic zone of a lens and/or to measure the refractive power of the optic zone of the lens to be tested.

In the apparatus according to this invention the substantially planar opaque means acts as a Foucault knife-edge to render the optic zone or zones of the test lens visible. If there are a plurality of optic zones present in the test lens these may be rendered visible even if adjacent zones are blended together at their junction. This technique also makes visible adjacent optic zones which have refractive powers which are not greatly different from one another.

The expression "optic zone" of a lens means a zone of a lens which is of substantially uniform refractive power over its whole extent. Originally it was common for the optic zone of a contact lens to be coextensive with the total area of the lens. More recently a monofocal contact lens will have a carrier zone surrounding the single optic zone. Bifocal contact lenses may have two substantially semi-circular optic zones or a first circular optic zone surrounded by a second annular optic zone.

The apparatus of the present invention is especially suitable for the observation and measurement of optic zones of bifocal and multifocal contact lenses.

The invention will be further described with reference to the drawings and photographs, described in relation to an embodiment of the invention.

BRIEF DESCRIPTION OF THE DRAWINGS

FIG. 1 illustrates schematically the illumination system of the apparatus according to the present invention, wherein a slit source S is collimated by lens system L1 and lens system L2 refocuses the slit on to the knife-edge at F and observer at O can see a field of red above and blue below;

FIG. 2 illustrates schematically the observation system of the apparatus according to the present invention wherein the contact lens CL located at the lens table T is imaged by lens system L2 to the anterior focal point of eyepiece O;

FIG. 3 illustrates schematically the principle of the apparatus wherein a negative power contact lens CLM produces divergent rays which, after refraction by lenses L2, are focused at G and wherein the view at the eyepiece O is of a field which is dark above;

FIG. 7 is a vertical sectional view along A-A of FIG. 6.

DETAILED DESCRIPTION OF THE PREFERRED EMBODIMENTS

The optical components of the apparatus, referred to hereinafter as a "zonometer", are shown in FIG. 1. A lens system L1 is placed in front of a slit light source s to produce a parallel, or collimated beam at T. A second lens system L2 refocuses this beam to a point F at which a knife-edge is placed. The knife-edge is adjusted vertically until it occludes approximately half the focused beam at F. The observer at O, looking along the optic axis, sees a field in which the upper half is red or orange and the lower half is greenish-blue or blue. This phenomenon is caused by the use of white light in an optical system which is not fully corrected for chromatic aberration.

In the zonometer, L2 is a fixed lens system which focuses the parallel beam from lenses L1 to the knife-edge at F. An eyepiece is placed at O. The contact lens to be measured is located at T.

The observation of the optic zone junction of the test lens is enhanced, as shown in FIG. 2, by having the image of the contact lens focused by L2 located at the anterior focal plane of the eyepiece.

As shown in FIG. 3, if a lens CLM of negative power, relative to the illumination system of the apparatus, is placed at T, the rays leaving T will be divergent. After refraction by lenses L2, the rays are focused at G, a point closer to the observer than F. The knife-edge prevents rays from reaching the top half of the field of view. The view at O is of a field which is dark above and bright below.

Figure 4:
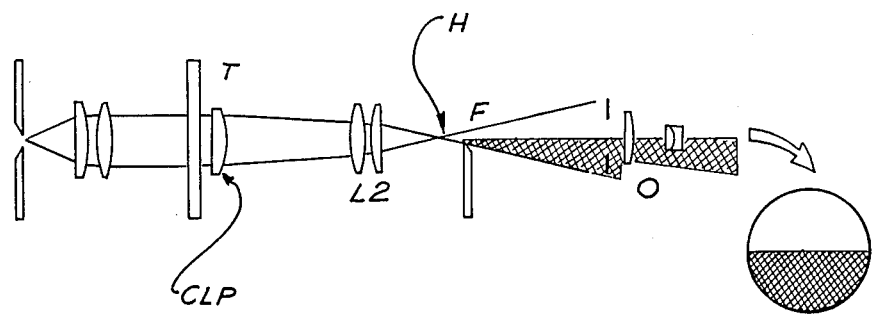
FIG. 4 further illustrates schematically the principle of the apparatus wherein a positive power contact lens CLP produces convergent rays which, after refraction by lenses L2, are focused at H and wherein the view at the eyepiece O is of a field which is bright above.

When a, relatively, positive lens CLP is placed at T, as illustrated in FIG. 4, the beam is focused at H, a point further from the observer than F. In this case, the knife-edge prevents rays below the optic axis from reaching the observer. The view at the eyepiece O is dark below and bright above.

Figure 5:
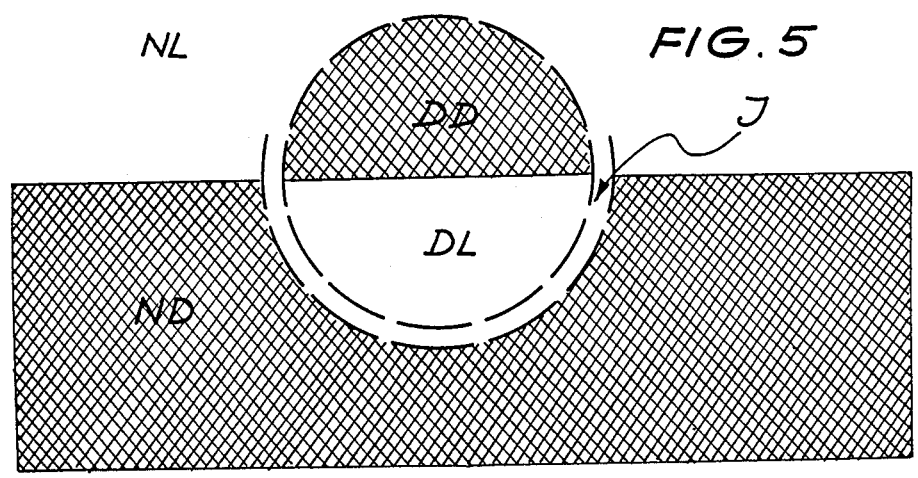
FIG. 5 represents schematically the view through the eyepiece of the apparatus wherein the circle is the distance optic zone and the surrounding is the peripheral near zone of a concentric distance centre bifocal contact lens, and the dark upper half DD of the central circular zone is caused by the relatively negative power of the distance optic zone whereas the dark lower half ND of the periphery is caused by the relatively positive power of the near zone and wherein the bright arc J marks the blended junction of the two zones.

The appearance as seen through this optical system of a concentric distance centre bifocal contact lens with its distance optic zone in the centre is shown in FIG. 5. In the centre of the view is a circular zone which has a bright lower half DL and a dark upper half DD. This appearance is caused by the relatively negative power of the central distance optic zone. In the same view, the surrounding peripheral zone has a dark lower half ND and a bright upper half NL. Here, the periphery is the near optic zone which is more positive and thus produces the dark half in the lower field. The bright arc J is caused by the highly convex blended junction between the two zones.

It will be appreciated that the pattern described with reference to FIG. 5 is achieved when one zone of the bifocal lens is positive and the other negative relative to the illumination system of the apparatus. This will be the case naturally when the refractive power of the apparatus without the test lens falls between its refractive power when measured with the respective zones of the bifocal lens included in the apparatus optics. Such a pattern may also be achieved by adjusting the distance between the light sources and the first lens system L1 of the apparatus, or otherwise causing a relative movement between the focal points of the system and the knife edge, so that the knife edge is positioned between the focal points of the apparatus measured respectively through the distant and near optic zones.

Due to this pattern produced by the optical system, the boundary between optic zones becomes easily visible.

The observation system of the zonometer allows the detection of minute debris and surface imperfections on the contact lens.

The use of a slit light source can give rise to a streaked appearance of the lens image. This problem can be solved by the use of a pin-hole light source, usually in combination with a higher powered light source to compensate for the decrease in illumination. A slit source was used in this embodiment of the zonometer to increase the illumination of the system.

Figure 6:
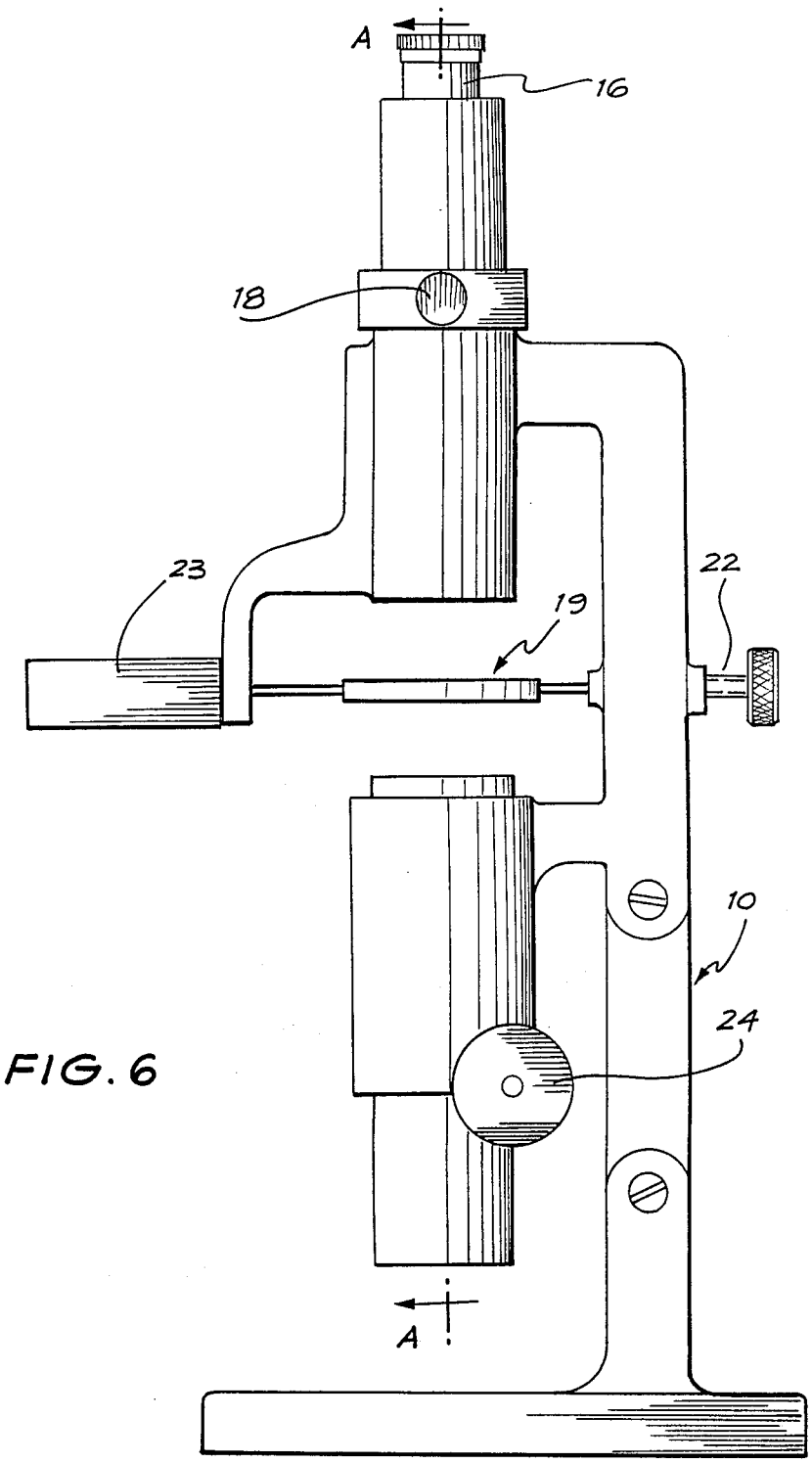
FIG. 6 is a side elevational view of a prototype. This prototype instrument which was modified from a Voigtlander (Registered Trade Mark) focimeter.

The zonometer 10, shown in FIGS. 6 and 7, was built onto a standard focimeter because many components of the described embodiment of a zonometer already exist in a focimeter. Although any focimeter may be converted to accomodate the optic system, an old focimeter (Voigtlander no. 401/00 refractometer) was modified for the purpose of this embodiment of the invention due to its large size and simple construction. Most of the hardware and fittings of the focimeter were retained; however, the telescopic observation system required total reconstruction.

For the illumination system, the focimeter target in this embodiment was replaced by two adjustable blades to produce a slit source 11. The original tungsten globe was replaced by a small twelve volt, 20 watt quartz halogen bulb 12. This bulb was installed with its filament along the optic axis of the system. A condenser mirror 13 was used to improve the illumination.

An alternative lighting system can be used by employing a light bulb with a single straight filament. The filament would be located at the anterior focal plane of lenses L1. This would obviate the need for the adjustable razor slit aperture.

Because the aperture of the existing standard lens was not large enough for the zonometer's requirement, the original lenses were replaced by a wide aperture lens system 14 with the same equivalent power.

The observation system was designed to match the field of view of the illumination system and to be sufficiently large for observing a large hydrated soft contact lens. This observation system comprises a telescopic (astronomical type) lens system 15 with a 25 mm (10×) Ramsden eyepiece 16 which was fitted with a cross-wire at its anterior focal plane. A razor-blade 17, clamped onto a bracket, acts as the knife-edge. The height of the razor-blade can be adjusted externally by a small knob 18.

The zonometer 10 was mounted vertically, thus enabling a wet cell to be used to prevent surface dehydration during measurement of hydrophilic lenses. A table 19 consisting of an optically flat glass plate 21 for holding the wet cell, was mounted on the focimeter's spectacle slide height adjusting screw 22. This screw 22 is used to translate the lens to be tested across the field of view of the observation system. A micrometer 23 is connected to the wet cell table 19. This micrometer 23 enables measurement of the amount by which the test lens has been moved across the field of view to an accuracy of 1 micron.

During optic zone measurement of a bifocal lens, the wet cell containing the lens is placed on the zonometer's wet cell table 19. The lens is located in the centre of the field of view. The power drum 24 of the zonometer 10 is rotated until the view shown previously in FIG. 5 is obtained. The position of the knife-edge is adjusted until the corners of the semi-circles are sharpest. The wet cell table 19 is moved by the advance screw 22 until the cross-wire of the eyepiece is tangentially touching the circumference of the zone to be measured. Next, the table 19 is translated until the cross-wire is in contact with a point on the circumference of that optic zone diametrically opposite to the first. The amount by which the lens table 19 has been translated is the optic zone diameter.

Using this procedure, operators obtained standard deviations of measurements of approximately 50 microns. the greatest difference found between four operators was less than 80 microns. The accuracy of this system is therefore quite high, especially in comparison to measuring magnifiers the graticules of which are generally marked in 100 micron steps.

Agreement between operators tends to decrease when the junction blend between zones increases. This is due primarily to the difficulty in locating the centre of a heavily blended junction.

Measurements can also be carried out by incorporating a graduated graticule in the Ramsden eyepiece 16. In such cases, the magnification of optical system must be considered.

Apart from the measurement of optic zones and overall lens diameter, the zonometer has a number of further applications.

(1) It can be seen from FIG. 5 that the width of the transition band J between the semi-circles of the inner zone and the surrounding concentric halves of the outer zone is dependent on the degree of junction blending. Therefore, this is a way of assessing the extend and uniformity of blending of a contact lens.

(2) The zonometer enables the operator to detect minute lens surface defects such as scratches, pits, debris or deposits. For detailed assessment of such defects, the 10X eyepiece may be replaced by a Ramsden eyepiece of a higher magnification.

(3) The refractive power of various zones of a bifocal contact lens can be measured by this instrument. The power of the zonometer is first ascertained by turning the power drum 24 until a point is reached where the field of view is represented by zones of blue and orange. This indicates that the knife-edge is positioned at the focal length of the illumination system of the zonometer 10. The bifocal contact lens is then placed in a wet cell on the table 19 and the power drum 24 is again turned until the central semi-circular dark or light zone becomes a full circle with blue and orange zones, in an instant before reappearing with the dark and light halves reversed. This is the position where the power of the central zone is neutralized. The power of the central zone can be read directly from the power drum 24.

Similarly, a second point can be found where the surrounding dark and light halves become a complete ring momentarily before they reappear with the light and dark halves reversed. Here, the power drum 24 indicates the power of the concentric zone.

In this embodiment, this measurement can only be approximate due to a number of uncorrected aberrations of the optical system, but with careful design and use of optimized optical components a zonometer can be built which can measure lens zonal powers accurately.

(4) Only the measurement and assessment of hydrophilic bifocal contact lenses have been mentioned in any great detail herein. However, all the applications described previously can be used in the assessment of other lenses, such as hard lenses or gas permeable lenses and also to intraocular lenses. These include the measurement of peripheral curve width, optic diameter, lens diameter and refractive power, the assessment of changes in peripheral curve radii, junction blending and surface quality. For these lenses, all measurements can be made with the lens in air, which greatly simplifies the task and improves accuracy due to increased contrast and clarity. Hydrophilic lens measurements are best carried out with the test lens in a wet cell.

I claim:

1. Apparatus for the measurement of the size of an optic zone of a lens and/or the refractive power of that optic zone, comprising a light source, an illumination system including a first lens train adapted to produce a collimated beam of light from the light source, and a second lens train adapted to focus the collimated beam, mounting means holding the lens being measured and positioned between the first and second lens trains to hold the lens to be measured in the collimated light beam, substantially planar opaque means including an adjustable knife-edged device positioned between said second lens train and an observer and within a part of the focussed beam from said second lens train to occlude said part of the focussed beam, an observation system coaxial with the illumination system, the observation system being adapted to allow the observer to observe the lens to be measured and comprising said second lens train and a further lens which forms an eye piece, said eye piece having an anterior focal plane coincident with the image of the lens to be measured, which image is a single image of said focal plane and is formed by the second lens train, and measurement means including a cross wire fitted to the eye piece at the anterior focal plane and a linear measurement device to measure the translation of the lens to be measured across the mounting means relative to the cross wire to determine the size of the optic zone of the lens.

2. Apparatus as claimed in claim 1 in which the light source is a slit source and comprises a light bulb and a pair of adjustable blades disposed between the bulb and the first lens train.

3. Apparatus as claimed in claim 2 in which the light source includes a condenser mirror which is placed on the side of the light bulb distal to the first lens train.

4. Apparatus as claimed in claim 1 in which the mounting means comprises an optically flat glass stage on which the test lens may be positioned.

5. Apparatus as claimed in claim 1 in which the measurement means is adapted to measure the refractive power of the said optic zone and comprises means to measure the refractive power of the illumination system with and without the said optic zone of the lens to be tested and to thereby allow the calculation of the refractive power of the said optic zone of the lens.

6. Apparatus as claimed in claim 5 in which the measurement means is adapted to measure the refractive power of the said optic zone and comprises means to move the light source relatively towards and away from the first lens train and to display an indication of such movement.

7. Apparatus as claimed in claim 1 in which the measurement means is adapted to allow a determination of the size of the optic zone of the lens and comprises a graticule positioned within the eyepiece.

8. Apparatus as claimed in claim 1 in which the opaque means may be moved across the focused beam.

9. Apparatus as claimed in claim 1, wherein the linear measurement device is a micrometer.

* * * * *